Figure 1:
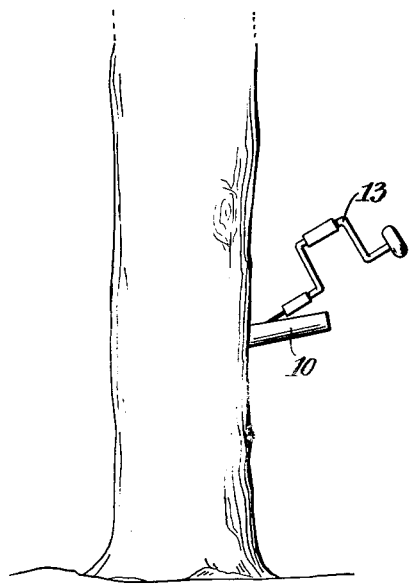

Nov. 16, 1943.  F. L. HOWARD ET AL  2,334,556

TREE THERAPY

Filed Dec. 18, 1941

INVENTORS
Frank L. Howard
Nestor C. Caroselli
BY
Kenyon & Kenyon
ATTORNEYS

UNITED STATES PATENT OFFICE 2,334,556

TREE THERAPY

Frank L. Howard, Kingston, and Nestor E. Caroselli, Providence, R. I.

Application December 18, 1941, Serial No. 423,422

8 Claims. (Cl. 47—57.5)

This invention relates to a method of treating trees to control pathological conditions thereof having their origin in pathogenic fungi or phytopathogenic bacteria capable of producing toxins, and a technique of carrying out that treatment. Because the discovery was made in the course of studies of the bleeding canker disease in sycamore and Norway maples and beeches, it will be described chiefly with reference thereto, but evidence has accumulated tending to show that the invention is likewise of benefit in the treatment of related conditions in several other types of maples and beeches and in certain types of elm, oak and birch.

For some years, it has been known that the dying of sycamore and Norway maples and beeches in certain parts of New England has been due to a pathological condition. The disease has come to be known as "bleeding canker" because it includes, as one of its external symptoms, the formation of cankers in the bark of the trunk and elsewhere. In these cankers fissures develop from which a reddish-brown watery fluid oozes which, upon drying, resembles dried blood in color. The underlying vascular tissues are usually infected before any external symptoms are noted.

Prior efforts to investigate the causes of this disease have revealed that the fungus *Phytophthora cactorum* is often fund associated with the decaying of affected tissue, but so far as we are aware, the mechanism by which this fungus produces its pathological effect has not been ascertained. Methods of control heretofore attempted have included excision of the affected tissue by bark tracing, but this has met with very poor success. Observations over five years have shown that lateral spread of the disease has resulted when this method is used, and repeated tracings have resulted in girdling without completely eradicating the pathogene. Moreover, methods of treatment which have had some success in the control of maple wilt, such as heavy feeding, have proved to be without beneficial value in checking the spread of bleeding canker disease.

Our investigations have revealed that the affected tissue of trees suffering from the bleeding canker disease yield a number of micro-organisms, including *P. cactorum*, a species of Alternaria and various bacteria which can be developed on culture media and identified. Inoculation of healthy young maple trees with the Alternaria fungus and these bacteria has proven that these organisms are not pathogenic, since no infection is thereby produced. On the other hand, numerous injections of healthy young maple trees with cultures of *P. cactorum* have produced the bleeding canker disease.

Our study of the maple and beech trees suffering from this disease, either naturally or of artificial inoculation, indicates that the greatest number of positive infections occurs in trees having a relatively greater sap flow. Larger trees, which have a greater foliation area and therefore greater sap flow, appear to have an increased number of lesions. Stimulation with nitrogenous fertilizer appears to promote spread of the pathological effects. Trees growing in wet soil appear more vulnerable; trees recently transplanted appear less vulnerable.

On the other hand, examination of neighboring tissue after artificial inoculation of *P. cactorum* into healthy trees, which have thereupon begun to show signs of disease at some distance from the point of inoculation, indicates that the fungus itself does not travel far in the vascular tissue. Often lesions resulting from artificial inoculation, and occurring at some distance up or down the trees from the point of inoculation, are quite free of *P. cactorum*, which appears to remain localized at or nearly at the point of inoculation.

Acting upon this evidence we have discovered that the pathological conditions associated with bleeding canker disease are due chiefly to the spread within the vascular tissue of a toxin produced by a pathogene which is capable of being transported from the seat of infection through the tubes of the tree to remote portions thereof. Preliminary laboratory experiments suggested this hypothesis. *P. cactorum* grown in the laboratory on a culture medium was thereafter filtered and centrifuged so as to separate from the fungus the toxin which had been produced during its growth. The toxin so obtained has been found to be capable within a few hours of causing wilting of the leaves of maple, tomato and snapdragon cuttings. The toxin appears to be non-crystalline, non-protein and thermolabile. It seems to posses characteristics similar to those of bacterial exotoxin. Injection of healthy maple trees with the toxin derived from laboratory cultures of *P. cactorum*, carefully filtered and centrifuged to eliminate the fungus itself, has produced characteristic symptoms of the bleeding canker disease therein. Other tests have indicated that toxin is probably produced in the host tissue by the fungus. It would appear that the toxin, whatever may be its chemical nature, produces the pathological condition in the trees by increasing the permeability of the protoplasts and hence decreasing their turgor pressure.

Based upon this discovery, we have devised a method of treatment applicable to living trees which has proven notably successful in controlling not only the disease of bleeding canker in maples and beeches, but appears to be of substantial value in controlling many types of disease in trees which have their origin in the presence of pathogenes where the pathological condition is caused by the spread of toxins through the tree tubes, either up or down from the seat of infection.

Laboratory experiments, amplified by repeated experiments on living naturally infected trees, have shown that the introduction into the tree tubes of dilute solutions of certain chemical substances will wholly "neutralize" or inactivate the effects of the toxin and, apparently, by depriving the fungus of a supply of rotted or affected tissue on which it can live, causes the centers of infection to die back and disappear. Several hundred maple and beech trees were treated in the manner hereinafter set forth. Most of these were large trees oozing at several places and requiring injection at from two to twelve points. If ability to isolate the pathogene can be considered a criterion of control, it can be said that eighty-five per cent of the trees were benefited by the treatment. Examination of the infected trees before treatment and again several months after treatment, showed several notable changes, including greener foliation, increase in leaf size, decrease in marginal browning, stoppage of bleeding from cankers, and no further lateral spread of lesions with callus formation in some instances. The evidence indicates that the fungus has been inhibited.

In carrying out our invention, we inject into the tree, in the manner hereinafter described, a dilute solution of a substance which serves to neutralize or inactivate the toxin itself, though not directly fungicidal at the concentrations used. Since, according to our view, the pathogene depends for its own growth upon destruction of tree tissue by the toxin which the pathogene produces, we thereby provide a means by which the pathogene is deprived of new sources of its own food supply. Thus the pathogene itself is indirectly controlled without resort to fungicides which would be impracticable in this situation because of their destructive effect upon tree tissue.

We have found that the toxin can be inactivated by injecting into the tree, generally through a hole drilled through the bark a few feet above the ground, a dilute solution of certain water-soluble salts of an azo-benzene containing an $NH_2$ group. Best results have been obtained by using the di-hydrochloride salt of 3,3' di-amino-azo-benzene which has the formula (3,3') $HCl.NH_2.C_6H_4.N:N.C_6H_4.NH_2.HCl$. Fairly good results have been obtained by using the related salt having the formula

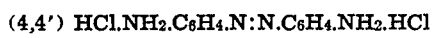
(4,4') $HCl.NH_2.C_6H_4.N:N.C_6H_4.NH_2.HCl$

The salt having the formula

(2,4') $HCl.NH_2.C_6H_4.N:N.C_6H_4.NH_2.HCl$ likewise gives beneficial results but appears to be somewhat less effective than those previously mentioned.

The active chemical mentioned above is often, because of its method of manufacture, associated with free hydrochloric or acetic acid. Such free acid is sometimes added to commercially available specimens of the active chemical in order to keep it suspended or in solution. Such free acid would be harmful to the living tissues when injected into trees and hence should be neutralized beforehand with a base. If such an acid is present, it can be neutralized by sulphonated castor oil or cocoanut oil, which likewise serves as an emulsifying or dispersing agent in the water solution.

The active chemical may be used in varying concentrations when injected into the tissue of a tree. We prefer to use a solution of one part of the active chemical (with added emulsifier or the like) in 200–500 parts of water. The degree of concentration is not critical, except that if the dosage be too concentrated it may injure the tree, and if too weak it may fail of its purpose. We use the word "sub-phytocidal" in the subjoined claims to indicate a concentration below that which will be seriously detrimental to the living tissue of the tree.

In order to inject this solution into a living tree, we have devised a technique which has proven convenient and successful. Essentially it is based upon the concept that the tubes within the living tissue of the tree, where the solution is to be introduced, shall be cut under water, so that no air bell will form, tending to prevent passage of the solution into the severed ends of the tubes within the tree.

Figure 2:
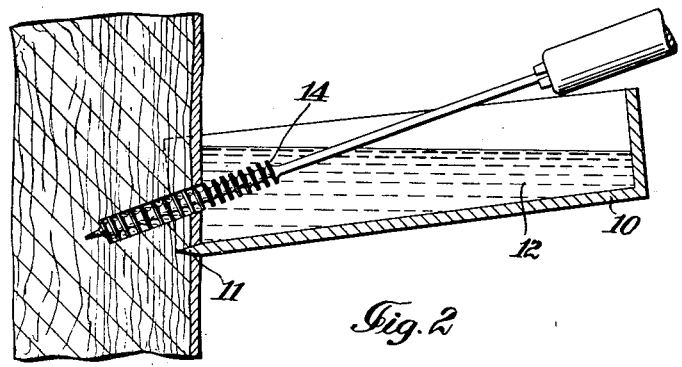

Referring to the annexed drawing:

Fig. 1 shows in front elevation the operation of boring the bark of a tree under water. Fig. 2 is a similar view in cross-section at the point of penetration.

A section 10 of metal tubing whose diameter is about 1½ inches and which is closed at one end, is cut in half lengthwise so as to form an open-top trough. The ends 11 of the tube at the open end are sharpened. This trough is then driven into a smooth section of bark, usually a few feet from the ground at convenient working height. It is then filled with a body of water 12. A brace 13 and bit 14 are then introduced and the hole is bored a short distance under the level of the water. The bore should preferably be at least one or more inches in length. We prefer to use a ¼-inch bit. In order to clear the hole, the bit is backed out while still being rotated in the direction of boring, and preferably we insert a small brush into the hole to clear it of any debris. While the hole is kept under water, a bottle containing the desired solution to be injected into the tree, and equipped with suitable tube and air vent, is then secured at a convenient neighboring point. Its delivery tube terminates preferably in a ¼-inch cork. This cork may be inserted into the hole and the flow started. Trees of medium size will be found to absorb several gallons of fluid in the course of a few hours. At the conclusion of the treatment, the hole may be permanently corked and the wound covered with tree paint. Often a larger tree will require as many as a dozen points of injection.

The method of treatment here described has been found to be of wide application in the treatment of various sorts of tree diseases where a weakly pathogenic fungus or phytopathogenic bacteria synthesizes a toxic substance that injures or kills the host cell protoplast prior to the advance of the pathogene. The mechanics of progress of the disease seems to be that the toxic substance produced by the pathogene kills the host cell protoplast and thus creates a rotted condition favorable to the spread of the pathogene. Our invention, in its broader aspect, is predicated upon the hypothesis that the pathogene cannot progress or obtain food suitable to its own development if the toxic substance which it produces is inhibited from killing the host tissue. By "neutralizing" or inactivating the toxin, we control the growth of the pathogene without introducing into the living tree fungicides which would themselves kill living tree tissue. It is believed that the invention is of material use in respect to diseases other than bleeding canker and extends broadly to all tree diseases whose spread depends upon the advance of toxins produced by pathogenic organisms within the living tissue.

We claim:

1. The method of treating pathological conditions in trees caused by toxin-producing pathogenes which comprises introducing into the tree tubes a sub-phytocidal quantity of a water-soluble salt of azo-benzene containing an $NH_2$ group.

2. The method of treating pathological conditions in trees caused by toxin-producing pathogenes which comprises introducing into the tree tubes a sub-phytocidal quantity of a hydrochloride salt containing the radical —$NH_2.C_6H_4.N:N.C_6H_4$—.

3. The method of treating pathological conditions in trees caused by toxin-producing pathogenes which comprises introducing into the tree tubes a sub-phytocidal quantity of a water-soluble salt of di-amino-azo-benzene.

4. The method of treating pathological conditions in trees caused by toxin-producing pathogenes which comprises introducing into the tree tubes a sub-phytocidal quantity of a hydrochloride salt of di-amino-azo-benzene.

5. The method of treating pathological conditions in trees caused by toxin-producing pathogenes which comprises introducing into the tree tubes a sub-phytocidal quantity of a di-hydrochloride salt of di-amino-azo-benzene.

6. The method of treating pathological conditions in trees caused by toxin-producing pathogenes which comprises introducing into the tree tubes a sub-phytocidal quantity of $(3,3')\,HCl.NH_2.C_6H_4.N:N.C_6H_4.NH_2.HCl$.

7. The method of treating pathological conditions in trees caused by toxin-producing pathogenes which comprises introducing into the tree tubes a sub-phytocidal quantity of $(4,4')\,HCl.NH_2.C_6H_4.N:N.C_6H_4.NH_2.HCl$.

8. The method of treating pathological conditions in trees caused by toxin-producing pathogenes which comprises introducing into the tree tubes a sub-phytocidal quantity of $(2,4')\,HCl.NH_2.C_6H_4.N:N.C_6H_4.NH_2.HCl$.

FRANK L. HOWARD.
NESTOR E. CAROSELLI.